US009361139B1

(12) United States Patent  
Baig

(10) Patent No.: US 9,361,139 B1
(45) Date of Patent: Jun. 7, 2016

(54) SYSTEM AND METHOD FOR VISUALIZING VIRTUAL SYSTEM COMPONENTS

(71) Applicant: Farhan Baig, London (GB)

(72) Inventor: Farhan Baig, London (GB)

(73) Assignee: CA, Inc., New York, NY (US)

(*) Notice: Subject to any disclaimer, the term of this patent is extended or adjusted under 35 U.S.C. 154(b) by 242 days.

(21) Appl. No.: 13/841,678

(22) Filed: Mar. 15, 2013

(51) Int. Cl.
G06F 9/455 (2006.01)

(52) U.S. Cl.
CPC .................................... G06F 9/455 (2013.01)

(58) Field of Classification Search
None
See application file for complete search history.

(56) References Cited

U.S. PATENT DOCUMENTS

| | | | |
|---|---|---|---|
| 8,732,607 B1* | 5/2014 | Grechishkin et al. | 715/781 |
| 2007/0094367 A1* | 4/2007 | Esfahany et al. | 709/223 |
| 2009/0276771 A1* | 11/2009 | Nickolov et al. | 717/177 |
| 2010/0191854 A1* | 7/2010 | Isci et al. | 709/226 |
| 2011/0261055 A1* | 10/2011 | Wong et al. | 345/440 |
| 2012/0324444 A1* | 12/2012 | Gulati et al. | 718/1 |
| 2013/0238665 A1* | 9/2013 | Sequin | 707/797 |
| 2014/0007093 A1* | 1/2014 | Deshpande et al. | 718/1 |

OTHER PUBLICATIONS

VMWARE, Inc., vSphere Basic System Administration, vCenter Server 4.0, Esx 4.0, ESXi 4.0, 2009, Chapter 20, pp. 229-232.

* cited by examiner

Primary Examiner — Dong Kim
(74) Attorney, Agent, or Firm — Baker Botts L.L.P.

(57) ABSTRACT

A method includes receiving status information regarding a plurality of virtual system components. Each of the virtual system components is associated with a respective virtual component category. The method also includes determining a hierarchy of the virtual component categories. The hierarchy includes a plurality of levels, each associated with a respective one of the virtual component categories. The method further includes determining a cluster threshold that defines a maximum number of the virtual system components having equivalent virtual component categories to be associated with a single node of a topology. The method still further includes determining that a subset of the virtual system components having equivalent ones of the virtual component categories exceed the cluster threshold, and generating the topology based upon the hierarchy and the cluster threshold. The method even further includes representing the subset of the virtual system components using a shared node of the topology.

20 Claims, 8 Drawing Sheets

SYSTEM AND METHOD FOR VISUALIZING VIRTUAL SYSTEM COMPONENTS

BACKGROUND

The disclosure relates generally to virtual components, and more specifically to a system and method for visualizing virtual system components.

SUMMARY

According to one embodiment of the disclosure, a method includes receiving status information regarding a plurality of virtual system components. Each of the virtual system components is associated with a respective virtual component category. The method also includes determining a hierarchy of the virtual component categories. The hierarchy includes a plurality of levels. Each of the plurality of levels is associated with a respective one of the virtual component categories. The method further includes determining a cluster threshold. The cluster threshold defines a maximum number of the virtual system components having equivalent virtual component categories to be associated with a single node of a topology. The method still further includes determining that a subset of the virtual system components having equivalent ones of the virtual component categories exceed the cluster threshold. The method also further includes generating the topology based upon the hierarchy and the cluster threshold. The method even further includes representing the subset of the virtual system components using a shared node of the topology. The method even further includes formatting the topology and the plurality of levels of the hierarchy for display at a user interface.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

Figure 1:
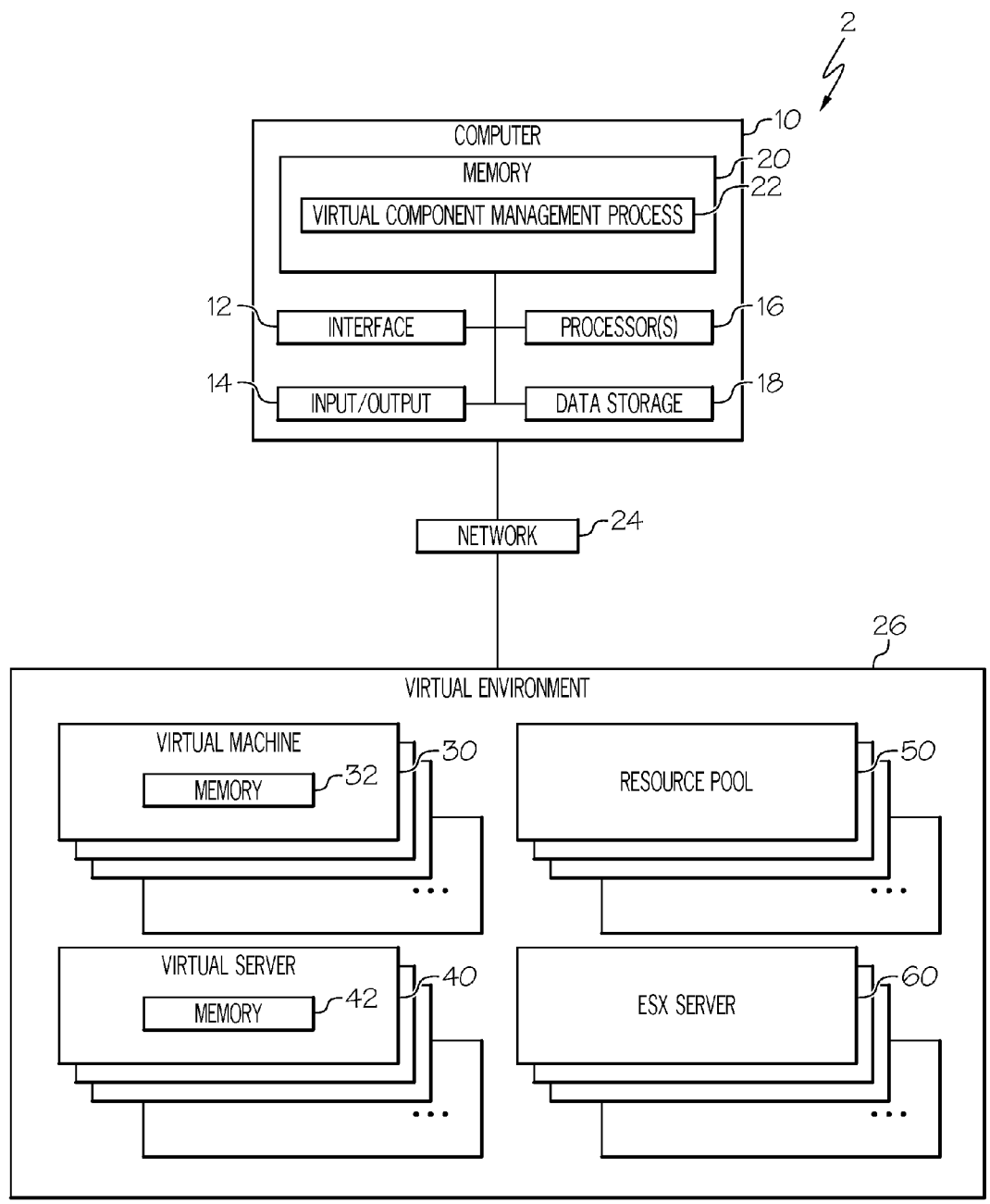
FIG. 1 illustrates a block diagram of a system for visualizing virtual system components in accordance with a particular embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADED, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Organizations that rely on IT computing infrastructures increasingly turn to cloud and virtual computing architectures to meet their needs. For large organizations, management of such infrastructures is a difficult task due to the complexity and nature of large-scale, dynamic and virtual computing systems. Typically, issues arise with data centers, virtual servers, or other nodes in the complex computing environment that require immediate action.

IT management tasked with administrating complex virtual computing environments require visualization and modeling tools for infrastructure maintenance and planning. For example, in the VMWARE® environment, there is a complex hierarchy of objects that have many components, including VCenter, DataCenters, ESX Servers, Resource Pools, and Virtual Machines. The number of components in each hierarchical level increases at each level of the hierarchy. In such a scenario, IT management may want to visualize the full hierarchy of components in a map without viewing the full complexity at every level.

Although from a product perspective, it may not be useful to view a full and complex component map, (e.g., topology, or graph) some managers require such a view. For example, when objects are in a critical or warning state, a manager may prefer to view an entire component map that displays the full hierarchy, rather than any simplified view. However, even in this example, the full component map may be unnecessarily complex.

In reference to FIG. 1, a system 2 for visualizing virtual system components is illustrated. System 2 represents an example system architecture diagram for a complex virtualized system, such as a virtual computing system for a large business organization. System 2 includes, among other things, a computer 10 running a virtual component management process 22, a network 24, and a virtual environment 26. Computer 10 is configured with software and network connectivity that enables users to manage virtual system components in an enterprise-scale virtual environment 26. In this example, virtual environment 26 is a VMWARE® virtual environment and includes many virtual machines 30, virtual servers 40, resource pools 50, and ESX servers 60. Such components may be scattered across separate data centers. Some components may contain virtualized memory (e.g., memory 32 of virtual machine 30). Computer 10 includes a memory 20, an interface 12, an I/O device(s) 14, a processor(s) 16 and data storage 18. Virtual component management process 22 monitors and evaluates virtual system component performance for virtual environment 26 using interface 12 and network 24, and displays performance information for a user at a display as part of input/output 14.

Network 24 may comprise any wireless and/or wired network that may enable communication between computer 10 and other system components. Computer 10 may include memory 20, interface 12, input/output 14, processor(s) 16, and data storage 18. Other computers connected to network 24 include similar components.

Memory 20 and/or data storage 18 may include any hardware, software, firmware, or combination thereof operable to facilitate storage and retrieval of information. Input and/or output devices 14 may facilitate communication between computing systems 10 and system components and/or within a particular computing system 10 or system component. Input/output 14 may comprise any device that may be used to communicate with computing system 10.

In certain embodiments, system 2 includes a virtual computing environment mapping function as part of virtual component management process 22. In such embodiments, the mapping may generate a topology tree map corresponding to the many components of virtual environment 26. Interface 12 detects virtual components in virtual environment 26 (e.g., virtual machine 30 and virtual server 40) and generates the tree topology map. In another example, virtual component management process 22 receives a list of components from input/output 14, and generates the mapping based on the list.

Each node of the generated tree topology may represent a virtual system component, and each virtual system component may correspond to a virtual environment component category hierarchy. For example, in the VMWARE® virtual environment, resource pool 50 hosts a set of virtual machines 30 and virtual servers 40. Resource pool 50 corresponds to a higher place in the virtual environment hierarchy than virtual server 40 or virtual machine 30 in the present example.

The virtual environment hierarchy may be predetermined. For example, virtual component management process 22 is set to manage VMWARE® virtual environments. With such a setting, virtual component management process 22 has a component category hierarchy established for each virtual component it detects. Thus, the topology map may be generated according to the predetermined virtual environment hierarchy of components. The hierarchy may have varying component categories at equal levels. For example, virtual server 40 and virtual machine 30 may be different component categories, but may be managed at equivalent hierarchical levels.

In other embodiments, the component category hierarchy may be determined by the input information. For example, a list of virtual components may be input into system 2 with hierarchical information embedded in each component. In still other embodiments, the component category hierarchy is determined by receiving virtual component category hierarchy information. For example, if virtual component management process 22 manages a third party virtual environment 26, the third party vendor supplies virtual component category hierarchy information that virtual component management process 22 may use to determine the component category hierarchy.

A cluster threshold may be received. For example, a user of system 2 may be prompted with a message dialog that prompts her to enter the maximum number of child nodes to display in the tree topology. The cluster threshold may determine the maximum number of system components with equivalent component categories displayed in the virtual component tree topology map.

For example, a tree topology may contain 50 virtual machines at a given ESX Server 60. But displaying the full map topology for this virtual environment may be too complex and not useful for IT management. In such situations, a cluster threshold may consolidate the 50 virtual machine nodes and represent them with one expandable virtual machine node. In another example, 10 virtual servers, 10 virtual machines, and 10 resource pools are present at a given ESX Server 60. If the cluster threshold is set below 10, the tree topology of the virtual environment includes only 4 nodes, instead of the potentially 31 nodes. Such a representation presents a more useable user experience to the IT manager. In this example, the user may scale up the cluster threshold in order to increase the viewable virtual system components. For example, the user may request a cluster threshold of 20. In this embodiment, the generated tree topology would display all 31 nodes of the virtual environment.

In other embodiments, system 2 may provide for virtual component information and statistics to be displayed, for example, based on a hover over of a user's mouse. In this embodiment, the tree topology representing virtual environment 26 contains hundreds of virtual machines 30, virtual servers 40, resource pools 50, and ESX servers 60. The cluster tolerance is set to 5 and the component category hierarchy is established as a VMWARE® virtual environment component category hierarchy. When the tree topology is displayed, resource pools with more than 5 virtual machines 30 have a consolidated node displayed. The consolidated node contains a description of the component category and the number of consolidated system components that the consolidated node represents. Other branches of the tree topology may include less than 5 virtual machines. In such branches, each virtual machine may be displayed by a single node. Each single node may contain information about the system component that the node represents (e.g., name, status, and usage level).

In the described embodiment, a user may hover an input device (ie., mouse) over a consolidated node to reveal a listing of system component names, an average utilization rate of the system components, a status for the group of system components, or other system component information. The user may click on the consolidated node in order to expand the consolidated node, and enumerate the system component nodes at that location.

The component category hierarchy may also be expanded and contracted to simplify virtual environment 26 tree topology viewing. For example, each vertical level of the tree topology may represent a component category in the component category hierarchy. In this example, level 1 may represent data centers. In level 2, resource pools or ESX Servers may be represented. Level 3 may represent virtual servers. In this embodiment, a user may click on any level of the hierarchy to expand or contract the component category level. All component categories (i.e., nodes and children system components) below the selected hierarchical level may be expanded or contracted. Such a configuration may further increase usability by IT managers, and may further simplify viewing and browsing of virtual system components.

Figure 2:
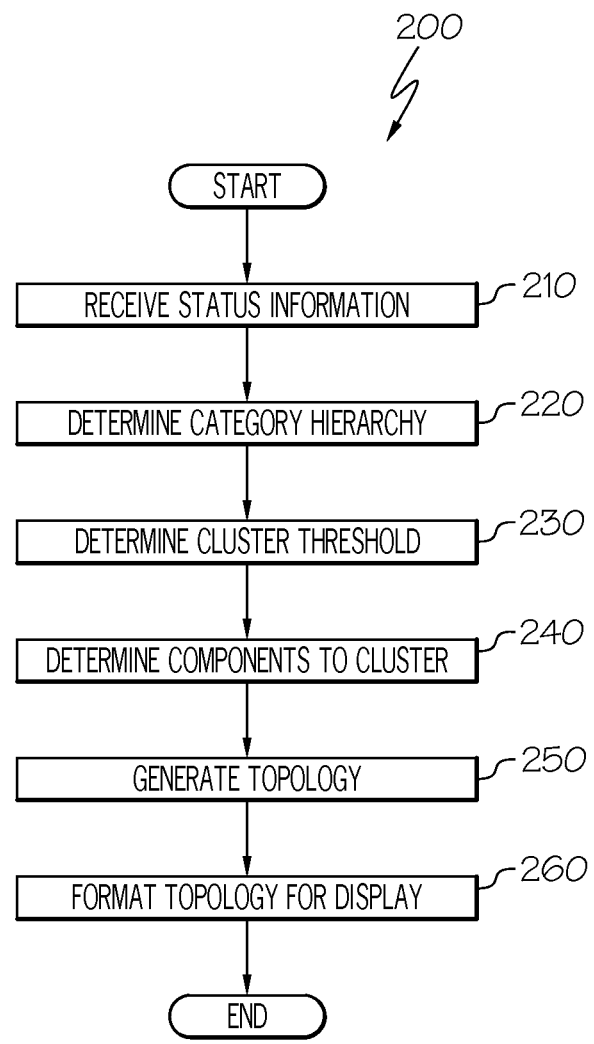
FIG. 2 illustrates a flowchart of a method for visualizing virtual system components in accordance with another embodiment.

In reference to FIG. 2, a method 200 for visualizing virtual system components is illustrated. At step 210, system 2 receives status information regarding a plurality of system components. In certain embodiments, the components are virtual system components as embodied in the descriptions associated with system 2. For example, virtual component management process 22 receives information about virtual machine 30, virtual server 40, resource pool 50, and ESX Server 60. Status information includes performance information, operational information, error information, operating system information, and information regarding the number and type of processes running on each component. In another example, the information regarding each component is retrieved from a database, hard disk, or other memory such as data storage 18. In still other embodiments, the information is received from a web service that supplies status information for system components.

Each of the virtual system components are associated with a respective virtual component category. For example, virtual machine 30 is associated with a VMWARE® Virtual Machine component category. Virtual server 40 is associated with a VMWARE® Virtual Server component category. In other embodiments, different component categories may be established. For example, virtual server 40 and ESX Server 60 are associated with a server component category.

At step 220, the category hierarchy is determined. In certain embodiments, the category hierarchy specification is specified to define system component categories and their connectivity in the topology. In other embodiments, system 2 infers category hierarchy information from the status information. For example, for a VMWARE® virtual environment 26, the component categories and category hierarchy are preconfigured in virtual component management process 22 because of the predefined strict component, category, and hierarchy structures in the VMWARE® virtual environment. For example, when virtual component management process 22 detects that the virtual implementation is a VMWARE® implementation, predefined vendor specific components, categories and hierarchies are used to guide generation of the viewing topology. In certain embodiments, users customize the predefined components, categories and hierarchies that are available.

In other embodiments, the category hierarchy is defined by the user. In this example, the user is asked to define a hierarchy relating the component categories to each other. For example, the user manually creates component categories and links physical and virtual components to each category. The user also links the categories together to form a hierarchy.

At step 230, a cluster threshold is determined. In certain embodiments, the user is prompted to input a cluster threshold. A default cluster threshold is set by component management process 22. In other embodiments component management process 22 reads a default cluster threshold from a configuration file. In still other embodiments, the cluster threshold is set automatically based on the relative complexity of the system components received. For example, in a complex system with thousands of system components, a smaller cluster threshold is set to reduce the complexity of the system. In such an embodiment, virtual component management process 22 automatically sets the cluster threshold without user interaction, but the user may step in to change the cluster threshold to a preferred threshold number.

At step 240, the components to cluster are determined. In certain embodiments, virtual component management process 22 loops through the virtual system components and determines which virtual system components have equivalent virtual component categories that exceed the cluster threshold.

At step 250, a topology is generated based on the hierarchy and the cluster threshold. The topology is generated such that it represents the virtual system components with equivalent virtual component categories that exceed the cluster threshold as a shared node of the topology. For example, in a scenario where five virtual machines are running on a single server, and the cluster threshold is 4, the topology represents the 5 virtual machine system component nodes as one shared node in the topology. At step 260 the topology and the levels of the hierarchy are formatted for display at a user interface.

Figure 3:
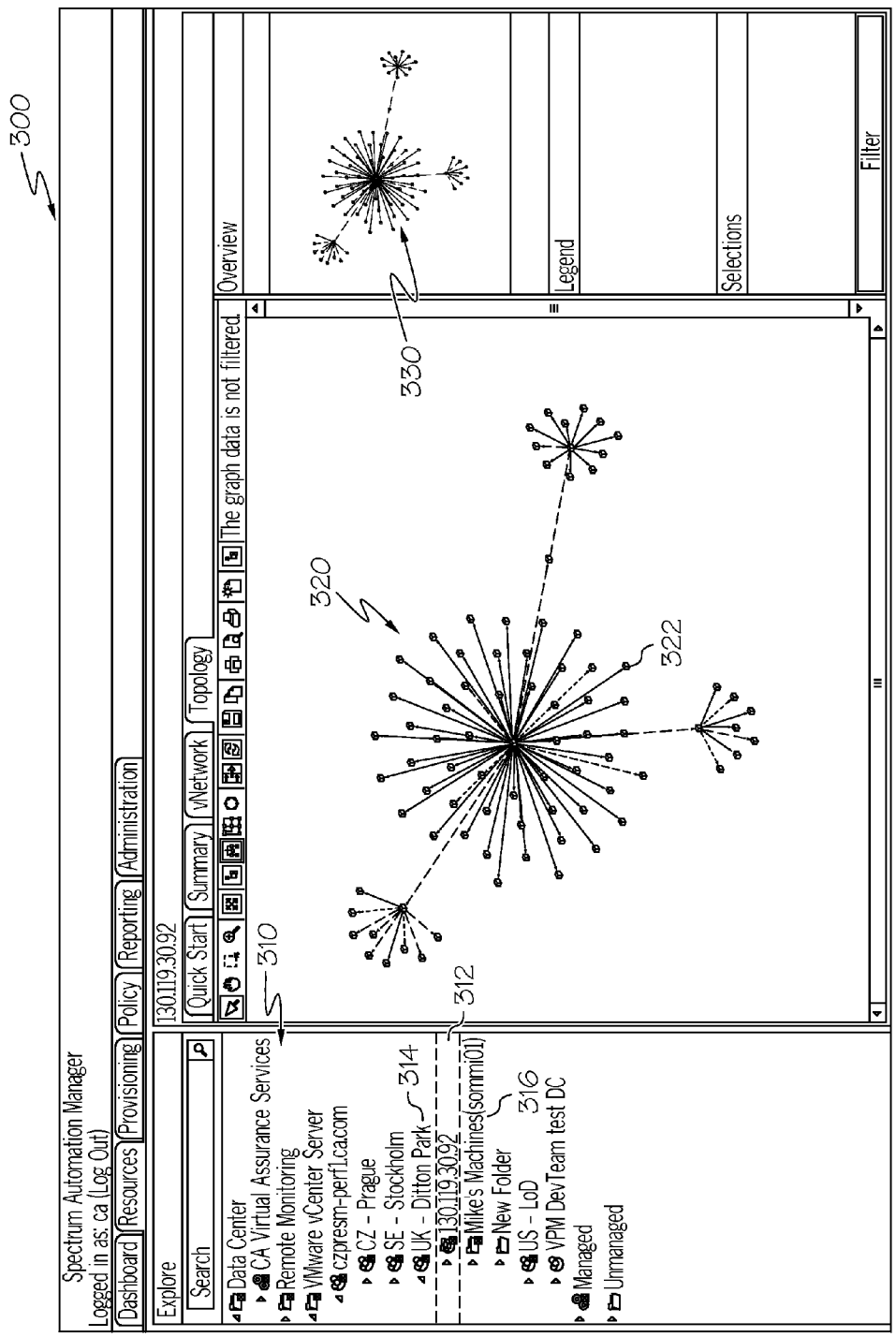
FIG. 3 illustrates an example of a graph depicting a complex virtual component category hierarchy.

Referring to FIG. 3, an example embodiment of a graph 320, generated from a system for visualizing virtual system components is illustrated. The illustrated embodiment represents a complex graph at the ESX Server level. The details of graph 320 are difficult to decipher due to the large number of nodes in the map. A tree-view hierarchy 310 indicates the category hierarchy of the virtual environment. The depicted virtual environment is similar to virtual environment 26 in system 2. Hierarchy selection 312 indicates that graph 320 displays a topology graph of an ESX Server layer. Accordingly, if a graph is displayed for an object at a higher level in hierarchy 310, (e.g., data center hierarchy selection 314) the graph may become even more complex and difficult to read (e.g., more nodes and edges may be added to the graph). For example, if hierarchy level 314 for "UK—Ditton Park" was selected in the tree hierarchy, all layers in the folders below are displayed in the graph view 320. A node 322 in graph 320 exemplifies just how difficult management of extremely large virtual component systems may be. For example, it is difficult to decipher that node 322 refers to a virtual machine, or what components node 322 may be linked to.

Such an embodiment of system 2 allows users to create custom folders to bookmark personal virtual components. For example, personal folder 316 in the tree view hierarchy shows a personal folder containing virtual machines and servers that a user has bookmarked to simplify graph display for those components. Overview window 330 presents a view of the end to end graph, such that the user may be able to determine their graph 320 extent relative to the entire virtual component graph.

Figure 4:
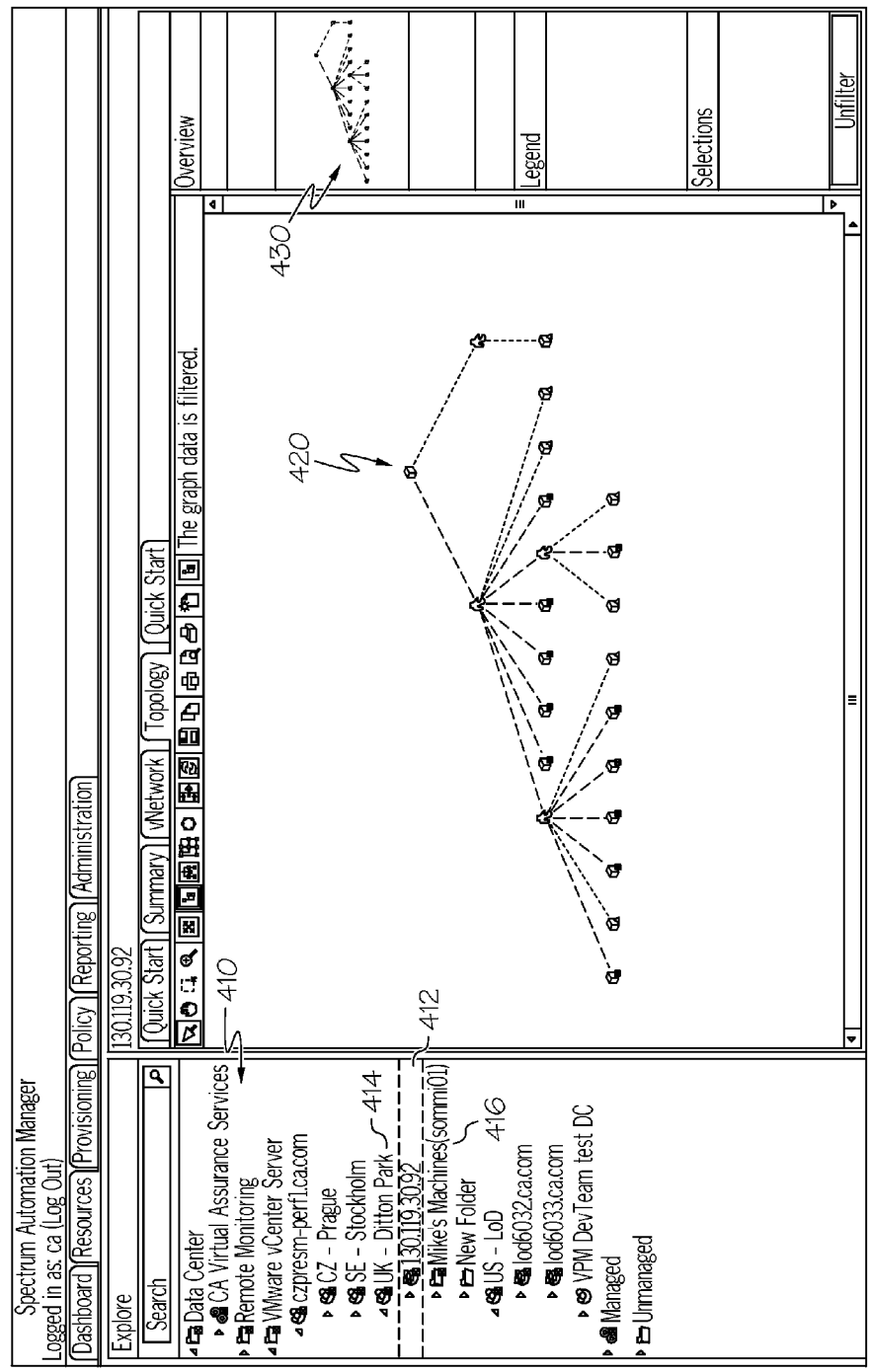
FIG. 4 illustrates an example of a graph depicting a complex virtual component category hierarchy, showing only the critical system components.

FIG. 4 illustrates an example of a graph depicting a complex virtual component category hierarchy, showing only the critical system components. Though not overly complex, depending on the environment this map too may become unreadable. For example, if the number of system components diagnosed with a non-normal state grew larger, or a data center became disabled due to a natural disaster, the graph may become as complex as the graph illustrated in FIG. 3.

In the present embodiment, hierarchy selection 412 indicates that graph 420 displays a topology graph of an ESX Server with IP address: 130.119.30.92. In certain embodiments, the IP address is replaced with a machine name or identifier. Graph 420 is further organized into the hierarchical view (e.g., a tree topology), which may present a more readable display as compared to graph 320 from FIG. 3. For example, the virtual machines and their parents are easily distinguishable. Selecting a different level in tree hierarchy 410 would present the user with graph 420 representing that level of the virtual category hierarchy. Vertical levels in the tree topology correlate to levels in hierarchy 410, and may be expanded and contracted as desired.

Figure 5:
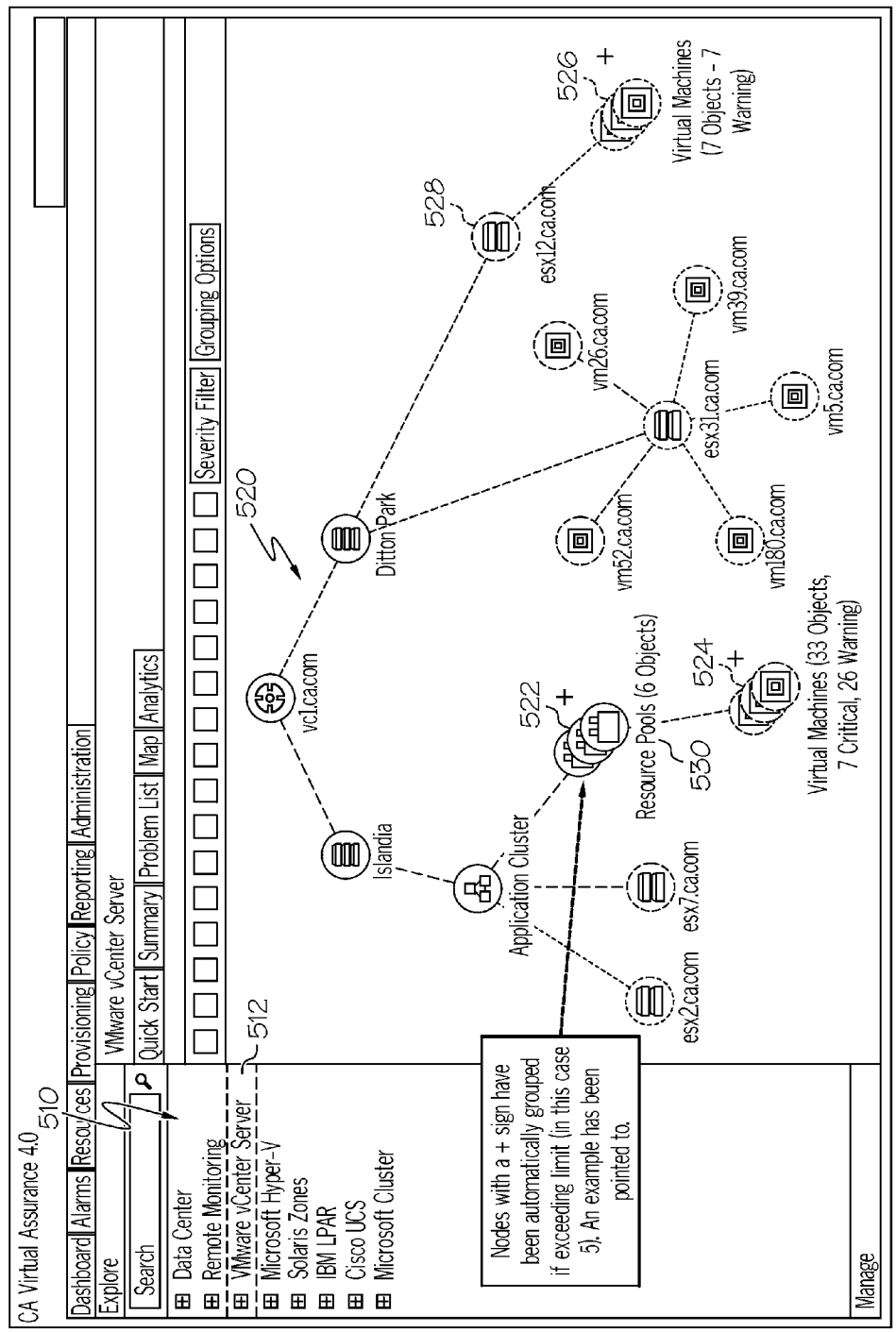
FIG. 5 illustrates an example of an interactive graph generated from one embodiment of a system for visualizing virtual system components.

FIG. 5 illustrates an example of an interactive graph generated from one embodiment of a system for visualizing virtual system components. In such a graph, objects of the same type with the same parent have been grouped if the number of such objects is more than a limit of 5. Thus, the cluster threshold in such a graph is set to 5, and the system components have been grouped and consolidated accordingly.

For example, a hierarchy 510 and hierarchy selection 512 indicate that graph 520 displays a VMWARE® virtual environment vCenter Server configuration. The simplifications may present the user with a more simplified view than graph 420 or graph 320 from FIG. 3-4. In this embodiment, graph 520 is displayed as a tree topology, and contains several consolidated nodes such as consolidated node 522. Consolidated node 522 may represent a grouping of resource pools. Such a grouping decreases the number of graph nodes that would otherwise be visible as the application cluster, and thus may increase readability and usability of graph 520. Caption 530 indicates that consolidated node 522 refers to a grouping of 6 resource pools. Further, consolidated node 524 indicates that the group of 6 resource pools at consolidated node 522 has (e.g., is hosting, running, or supporting) 33 virtual machines. Another example includes consolidated node 526, which represents seven virtual machines.

Consolidated nodes 524 and 526 may contain component status information. For example, consolidated node 526 has a caption displayed that indicates the number of such nodes in the warning state. In this case, consolidated node 526 indicates that all seven virtual machines represented by the node are in the warning state, and may require maintenance or attention.

Figure 6:
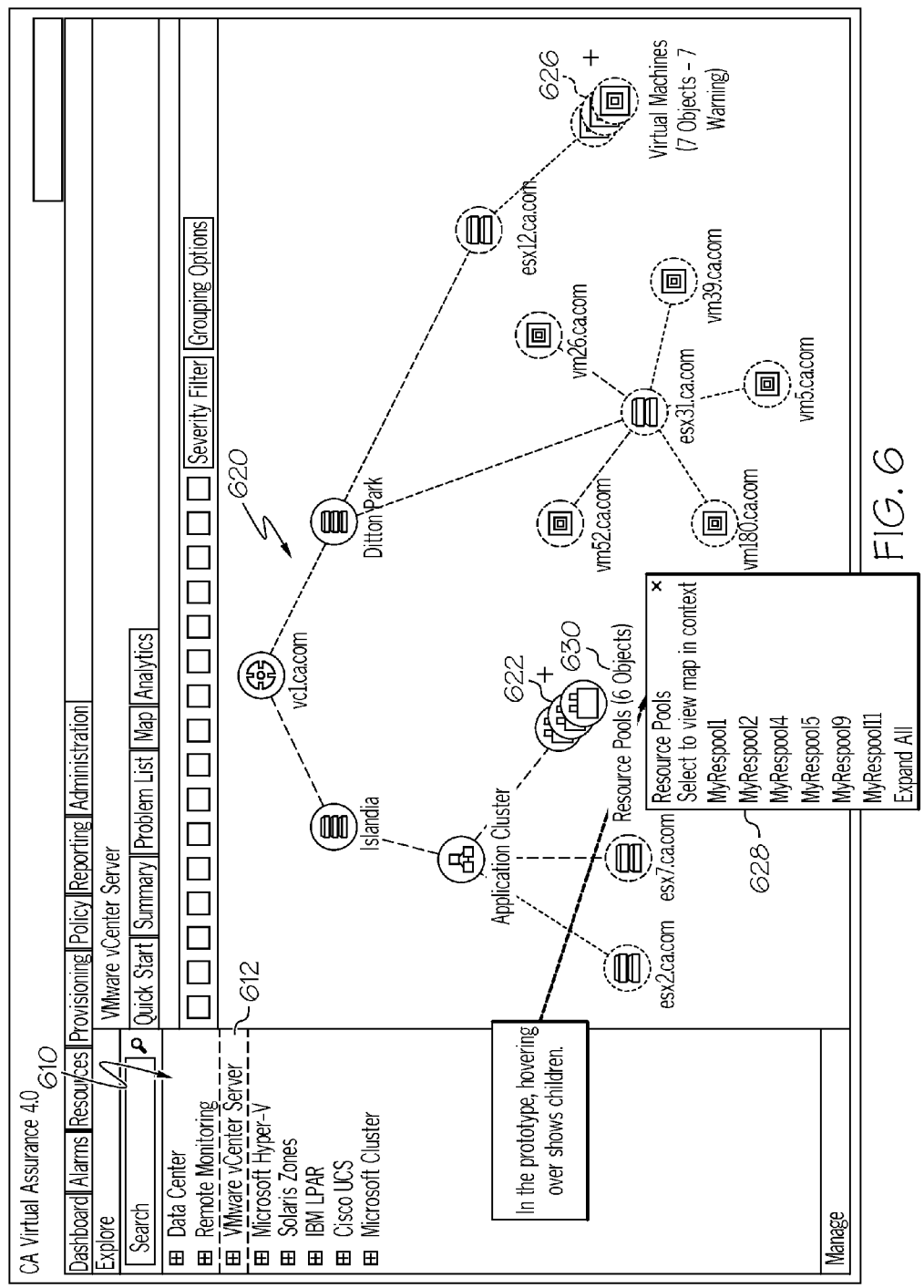
FIG. 6 illustrates an example of an interactive graph generated from another embodiment of a system for visualizing system components.

FIG. 6 illustrates an example of an interactive graph generated from another embodiment of a system for visualizing system components. In this embodiment, system 2 may display the contents of a group without expanding the group. For example, graph 620 includes consolidated node 622 that contains 6 resource pools. If a user moves an input device (e.g., mouse cursor) over consolidated node 622, tool-tip 628 may display a list of names of all resource pools represented by consolidated node 622.

In the depicted embodiment. Consolidated node 622 represents six resource pool objects. Moving, for example, a mouse cursor over consolidated node 622 displays tooltip 628, which enumerates the names of all resource pools represented at consolidated node 622.

Figure 7:
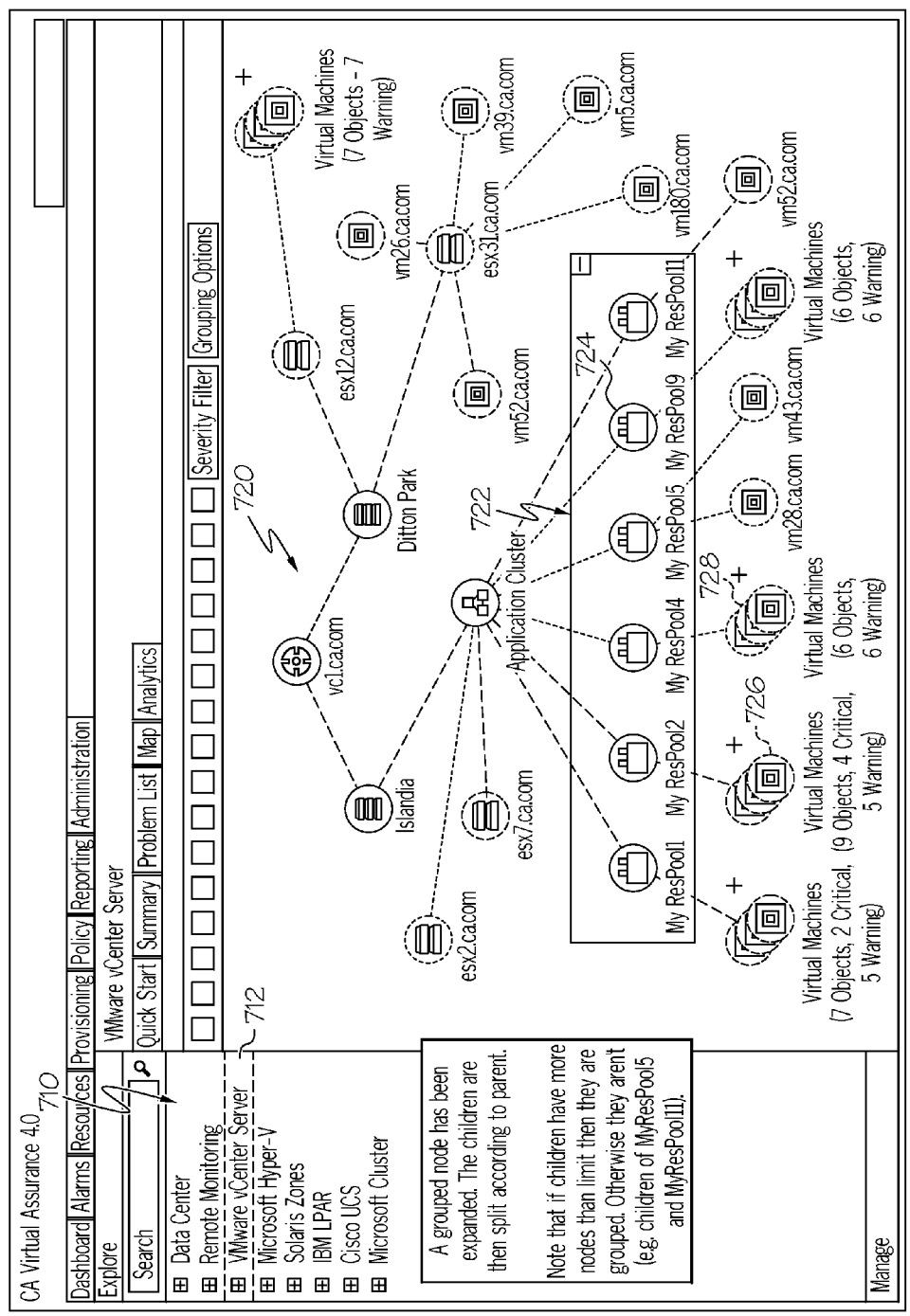
FIG. 7 illustrates the interactive graph from FIG. 5 after a grouped node has been clicked.

FIG. 7 illustrates the interactive graph from FIG. 5 after a grouped node has been clicked. The illustrated embodiment shows a group being expanded and the effect on its children. In such an example, the map is redrawn from the expanded node downwards. For all the expanded children, the cluster threshold, if there are more objects than the limit, is automatically enforced. For example, a user viewing graph 620 from FIG. 6 clicks consolidated node 622. FIG. 7 displays the resulting graph 720. In this example, grouping 722 shows each resource pool represented at consolidated node 622 from FIG. 6. As a result of clicking consolidated node 622, grouping 722 expands to display each individual resource pool 724, and their respective child node groupings (e.g., virtual machine child consolidated nodes 726 and 728).

In another example, the user may click grouping 722 to minimize the grouping of resource pools, and consolidate such nodes as a consolidated node, similar to consolidated node 622 from FIG. 6.

Figure 8:
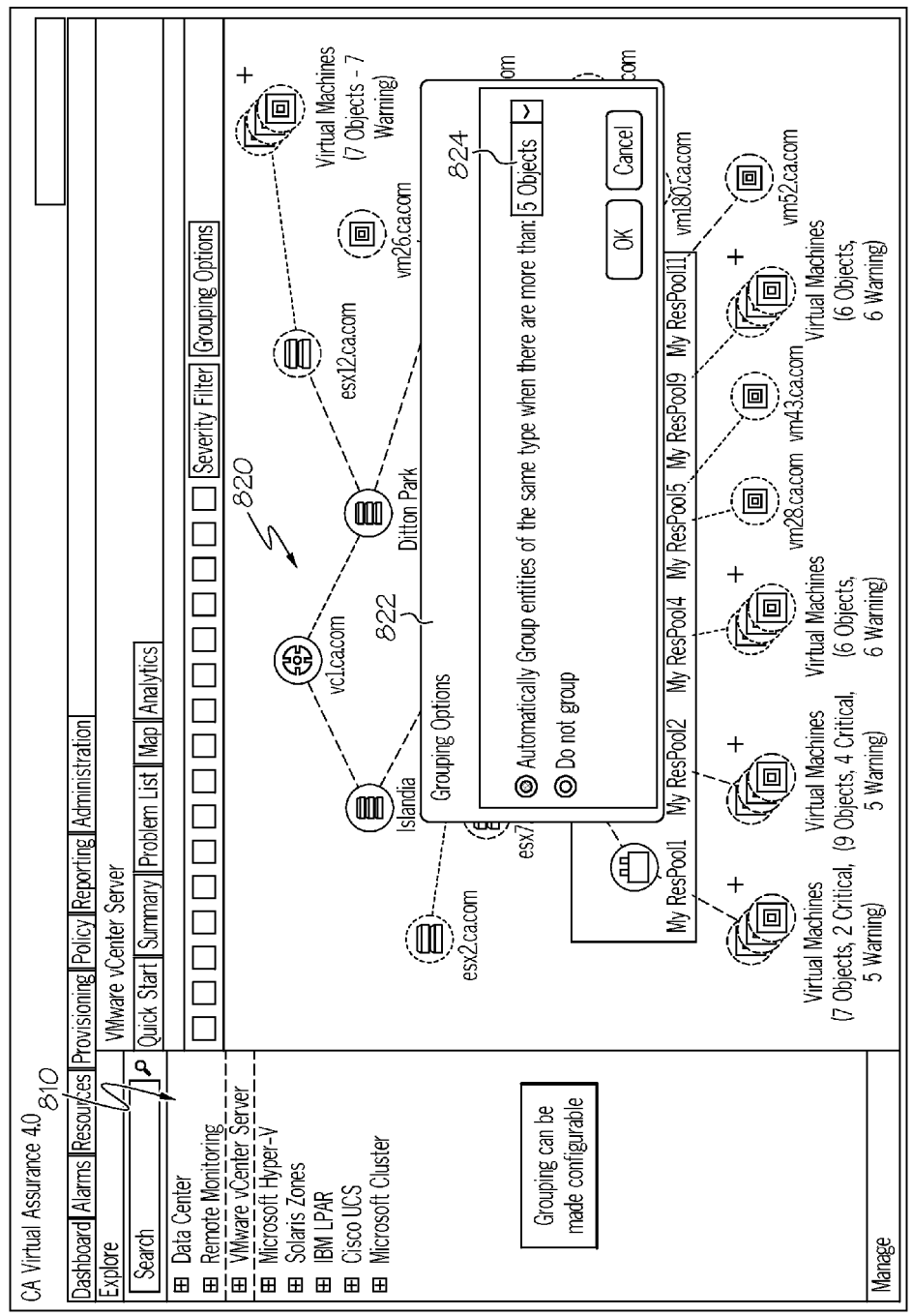
FIG. 8 illustrates receiving a cluster threshold in accordance with one embodiment of a system for visualizing virtual system components.

FIG. 8 illustrates receiving a cluster threshold in accordance with one embodiment of a system for visualizing virtual system components. This embodiment shows how a particular application could allow the user to configure the grouping limit (i.e., cluster threshold). For example, grouping options display 822 may receive a cluster threshold 824 as a user input. The cluster threshold may then determine the maximum number of individual virtual system components in the same component category to display before consolidating such nodes into a consolidated node.

In certain embodiments, the disclosure may condense virtual system component information in a topology map/graph automatically in a meaningful way by grouping objects of the same type with the same parent based on a configurable limit. A set of objects may then be grouped (e.g., ESX Servers) but the map may not collapse the hierarchy below. Rather, the objects below will also be visualized and will be grouped if they exceed the defined limit. When implementing a map in this manner, it should also be possible to interactively expand a grouped node. This may dynamically split the children below.

In other embodiments, the system displays an end-to-end topology without the complexity that is typical of such topologies. For example, the user chooses to drill down into any layer of the topology by expanding nodes. This may differ from tree node expansion because with a tree, the user goes from parent to child, rather than drilling into any layer.

An example of a typical virtual hierarchy on which the disclosure may be applied is the Map feature on the VMWARE® vSphere client. The standard map available may not allow for simplification. Such virtual hierarchies may result in complex and chaotic map views.

The present disclosure may also be applied to other virtual computing topologies and other applications. For example, the system for visualizing virtual system components may be applied to organizational charts. Selecting a node in the organization chart expands the level of employees with a certain job title. Employees that report to that employee may be displayed below, and may be further grouped in accordance with the present disclosure.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving status information regarding a plurality of virtual system components, each of the virtual system components being associated with a respective virtual component category and a respective parent system component;
   determining a hierarchy of the virtual component categories, the hierarchy comprising a plurality of levels, each of the plurality of levels being associated with a respective one of the virtual component categories;
   determining a cluster threshold, the cluster threshold defining a maximum number of the virtual system components having an equivalent level of virtual component categories and having common parent system components to be associated with a single node of a topology;
   determining that a subset of the virtual system components having the equivalent level of virtual component categories and having a common parent system component exceed the cluster threshold;
   generating the topology based upon the hierarchy and the cluster threshold;
   representing the subset of the virtual system components using a shared node of the topology; and
   formatting the topology and the plurality of levels of the hierarchy for display at a user interface.

2. The method of claim 1, wherein the virtual component categories comprise:
   a data center category;
   a resource pool category;
   a server category; and
   a virtual machine category.

3. The method of claim 1, wherein the respective virtual component categories include first and second distinct virtual component categories, and further comprising receiving an indication that defines the first virtual component category as being equivalent to the second virtual component category for purposes of the hierarchy.

4. The method of claim 1, further comprising receiving a simplification command associated with one of the levels of the hierarchy, wherein the simplification command specifies the highest level of the hierarchy to display.

5. The method of claim 4, further comprising modifying the topology based on the simplification command.

6. The method of claim 1, further comprising:
receiving a selection of the shared node from a user; and
in response to the selection of the shared node, displaying identities and details of the subset of virtual system components represented by the shared node.

7. The method of claim 6, wherein receiving the selection of the shared node comprises detecting a mouse-over of the shared node.

8. A computer configured to access a storage device, the computer comprising:
a processor; and
a non-transitory, computer-readable storage medium storing computer-readable instructions that when executed by the processor cause the computer to perform:
receiving status information regarding a plurality of virtual system components, each of the virtual system components being associated with a respective virtual component category and a respective parent system component;
determining a hierarchy of the virtual component categories, the hierarchy comprising a plurality of levels, each of the plurality of levels being associated with a respective one of the virtual component categories;
determining a cluster threshold, the cluster threshold defining a maximum number of the virtual system components having an equivalent level of virtual component categories and having common parent system components to be associated with a single node of a topology;
determining that a subset of the virtual system components having the equivalent level of virtual component categories and having a common parent system component exceed the cluster threshold;
generating the topology based upon the hierarchy and the cluster threshold;
representing the subset of the virtual system components using a shared node of the topology; and
formatting the topology and the plurality of levels of the hierarchy for display at a user interface.

9. The computer of claim 8, wherein the virtual component categories comprise:
a data center category;
a resource pool category;
a server category; and
a virtual machine category.

10. The computer of claim 8, wherein the respective virtual component categories include first and second distinct virtual component categories, and wherein the computer-readable storage medium further causes the computer to perform receiving an indication that defines the first virtual component category as being equivalent to the second virtual component category for purposes of the hierarchy.

11. The computer of claim 8, wherein the computer-readable storage medium further causes the computer to perform receiving a simplification command associated with one of the levels of the hierarchy, wherein the simplification command specifies the highest level of the hierarchy to display.

12. The computer of claim 11, wherein the computer-readable storage medium further causes the computer to perform modifying the topology based on the simplification command.

13. The computer of claim 8, wherein the computer-readable storage medium further causes the computer to perform:
receiving a selection of the shared node from a user; and
in response to the selection of the shared node, displaying identities and details of the subset of virtual system components represented by the shared node.

14. The computer of claim 13, wherein receiving the selection of the shared node comprises detecting a mouse-over of the shared node.

15. A computer program product comprising:
a non-transitory computer-readable storage medium having computer-readable program code embodied therewith, the computer-readable program code comprising:
computer-readable program code configured to receive status information regarding a plurality of virtual system components, each of the virtual system components being associated with a respective virtual component category and a respective parent system component;
computer-readable program code configured to determine a hierarchy of the virtual component categories, the hierarchy comprising a plurality of levels, each of the plurality of levels being associated with a respective one of the virtual component categories;
computer-readable program code configured to determine a cluster threshold, the cluster threshold defining a maximum number of the virtual system components having an equivalent level of virtual component categories and having common parent system components to be associated with a single node of a topology;
computer-readable program code configured to determine that a subset of the virtual system components having the equivalent level of virtual component categories and having a common parent system component exceed the cluster threshold;
computer-readable program code configured to generate the topology based upon the hierarchy and the cluster threshold;
computer-readable program code configured to represent the subset of the virtual system components using a shared node of the topology; and
computer-readable program code configured to format the topology and the plurality of levels of the hierarchy for display at a user interface.

16. The computer program product of claim 15, wherein the virtual component categories comprise:
a data center category;
a resource pool category;
a server category; and
a virtual machine category.

17. The computer program product of claim 15, wherein the respective virtual component categories include first and second distinct virtual component categories, and further comprising computer-readable program code configured to receive an indication that defines the first virtual component category as being equivalent to the second virtual component category for purposes of the hierarchy.

18. The computer program product of claim 15, the computer-readable program code further comprising computer-readable program code configured to receive a simplification command associated with one of the levels of the hierarchy, wherein the simplification command specifies the highest level of the hierarchy to display.

19. The computer program product of claim 18, the computer-readable program code further comprising computer-readable program code configured to modify the topology based on the simplification command.

20. The computer program product of claim 15, the computer-readable program code further comprising:
computer-readable program code configured to receive a selection of the shared node from a user; and
computer-readable program code configured to, in response to the selection of the shared node, display identities and details of the subset of virtual system components represented by the shared node.

* * * * *